United States Patent [19]
Kurle et al.

[11] Patent Number: 5,721,377
[45] Date of Patent: Feb. 24, 1998

[54] ANGULAR VELOCITY SENSOR WITH BUILT-IN LIMIT STOPS

[75] Inventors: Juergen Kurle, Reutlingen; Kurt Weiblen, Metzingen; Horst Muenzel, Reutlingen; Helmut Baumann, Gomaringen; Klaus Heyers; Markus Lutz, both of Reutlingen, all of Germany

[73] Assignee: Robert Bosch GmbH, Stuttgart, Germany

[21] Appl. No.: 681,243

[22] Filed: Jul. 22, 1996

[30] Foreign Application Priority Data

Jul. 22, 1995 [DE] Germany .................... 195 26 903.9

[51] Int. Cl.$^6$ .................................................. G01P 9/04
[52] U.S. Cl. ............................................... 73/504.12
[58] Field of Search .................... 73/504.12, 504.14, 73/504.15, 504.16, 504.04, 514.32, 514.38, 514.16

[56] References Cited

U.S. PATENT DOCUMENTS

| | | | |
|---|---|---|---|
| 5,275,047 | 1/1994 | Zabler et al. | 73/504.12 |
| 5,396,797 | 3/1995 | Hulsing, II | 73/504.04 |

FOREIGN PATENT DOCUMENTS 0 539 393 B1  5/1993  European Pat. Off. .

*Primary Examiner*—John E. Chapman
*Attorney, Agent, or Firm*—Kenyon & Kenyon

[57] ABSTRACT

In an angular velocity sensor, an acceleration sensor is arranged on a resonator formed of a multilayer substrate and attached to a resonating bar. The multilayer substrate includes a top silicon layer, an insulating sacrificial layer arranged below the top silicon layer, and a bottom silicon layer arranged below the insulating sacrificial layer. An excitor causes the resonator to vibrate while a limit stop, configured out of the multilayer substrate, limits the movement of the resonator.

13 Claims, 4 Drawing Sheets

5,721,377

ANGULAR VELOCITY SENSOR WITH BUILT-IN LIMIT STOPS

BACKGROUND INFORMATION

An rpm sensor composed of a multilayer substrate is described in German Patent Application No. 19 504 151. The multilayer substrate has a bottom silicon layer and a top silicon layer, an insulating sacrificial layer being provided therebetween. A resonator, which is suspended on resonating bars, is configured out of the multilayer substrate. An acceleration sensor suitable for measuring Coriolis accelerations, which can occur normal to the axis of vibration, is provided on the resonator.

European Patent Application No. EP 539 393 describes an rpm sensor in which the resonator is configured out of multilayer substrates. From this document, a plurality of methods for exciting resonators of this type are known, in particular by means of electrostatic actuation, electromagnetic actuation, and thermomechanical actuation.

SUMMARY OF THE INVENTION

An advantage of the rpm (angular velocity) sensor according to the present invention is that the excursions of the resonator are limited by limit stops so as to enhance the performance reliability and ruggedness of the sensor. In particular, by using limit stops, one reduces the sensitivity (responsivity) of the sensor to substantial linear accelerations.

Since the resonator is able to be deflected in parallel to the substrate quite easily, parallel limit stops are advantageously provided to restrict excursions of this type. To reduce the etching time required in manufacturing the sensors, the thickness of the bottom silicon layer should be decreased underneath the resonator. To limit excursions of the resonator normal to the vibration direction, limit stops are then provided, which are either configured out of the bottom silicon layer or are provided on an additional plate. If the thickness of the bottom silicon layer can be selected to be thin enough right from the start, one will be able to limit the excursion by mounting the sensor on a plate. In so doing, the clearance between the plate and the resonator can be adjusted quite simply by varying the thickness of the interconnection layer accordingly. A cover protects the rpm sensor from contamination and, thus, restricts the upward excursion of the resonator.

DETAILED DESCRIPTION

Figure 1:
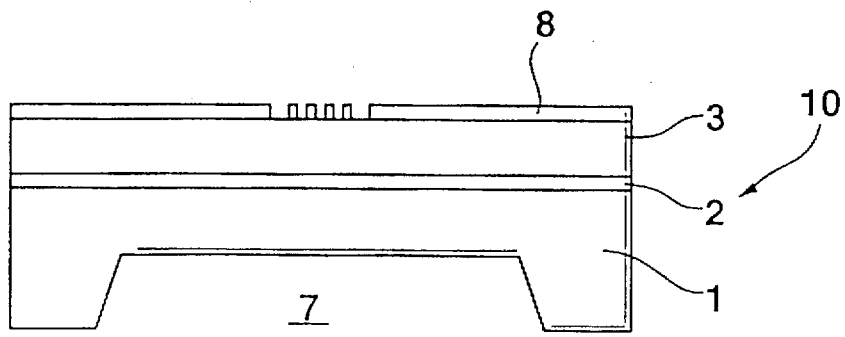
FIG. 1 illustrates a first part of a method for manufacturing an rpm sensor.

FIG. 1 illustrates a multilayer substrate 10 comprising a bottom silicon layer 1 and a top silicon layer 3. Disposed between the two silicon layers 1, 3 is an insulating sacrificial layer 2. As a rule, the bottom silicon layer 1 is a silicon wafer, onto which a sacrificial layer 2, for example of silicon oxide, silicon nitride, or glass, is applied. An upper silicon layer 3 is produced on this by means of deposition out of a plasma, or by bonding another silicon wafer onto a top silicon layer 3. Depending on the fabrication method, the top silicon layer 3 can be made of a polycrystalline, monocrystalline, or a mixture of monocrystalline and polycrystalline silicon material. A recess 7, which will reduce the thickness of the bottom silicon layer 1 in regions, can be introduced into the rear side of the multilayer substrate 10. By decreasing the thickness of the bottom silicon layer 1 in this manner, etching times are reduced when trenches are to be introduced through the bottom silicon layer 1.

A first etching mask 8 is applied to the top side of the multilayer substrate 10. This first etching mask 8 contains the patterns for an acceleration sensor, which is described further below with reference to FIGS. 3 and 4. An etching step then follows, in which the patterns of the etching mask 8 are introduced into the upper silicon layer 3, the trenches being formed by this means extending down to the sacrificial layer 2. Photoresist or silicon-oxide or silicon-nitride layers patterned accordingly can be used as material for the first etching mask 8.

Figure 2:
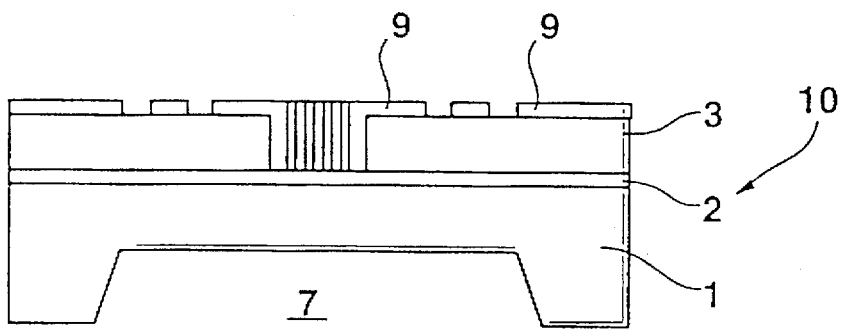
FIG. 2 illustrates a second part of a method for manufacturing an rpm sensor.

FIG. 2 illustrates that a second etching mask 9 is applied in another step. This second etching mask 9 defines patterns for introducing etched trenches into the multilayer substrate 10, which extend through the upper silicon layer 3, the sacrificial layer 2, and the bottom silicon layer 1. The etching time required for this is reduced because of the previously introduced recess 7. The etching mask 9 is subsequently removed again. The sacrificial layer 2 is then etched in another process step. This step of etching the sacrificial layer 2 follows as an isotropic step, so that regions of the sacrificial layer 2 disposed between the top silicon layer 3 and the bottom silicon layer 1 are also etched, an etch-undercutting thus being performed on the patterns introduced in the top silicon layer 3. However, the etching is only performed for a short time, so that only patterns having a small lateral extent are completely undercut in etching.

Figure 3:
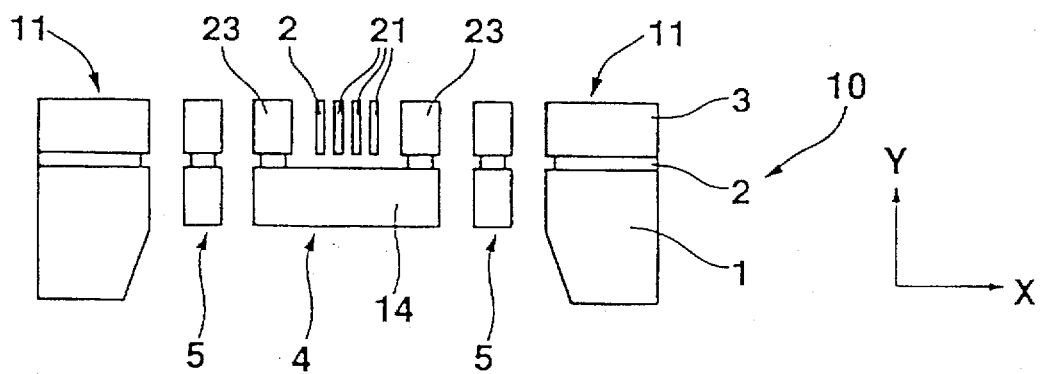
FIG. 3 shows a schematic cross-section through a finished rpm sensor.

FIG. 3 depicts the multilayer substrate 10 following the etching of the sacrificial layer 2. With the manufacturing process, a sensor element having a plurality of different regions has now been produced. The frame 11 still has the original thickness of the layers 3, 2 and 1 and is especially well suited for holding the sensor.

In addition, resonating bars 5 are now created, whose dimensions in the X-direction are relatively small compared to the dimensions in the Y-direction. Therefore, the resonating bars 5 are able to travel out quite easily in the X-direction, whereas they are comparatively stiff in the Y-direction. Furthermore, the upper region of the resonating bar 5, which had been formed out of the upper silicon layer 3, is mechanically fixed, but joined through the insulation of the sacrificial layer 2 to the bottom part that had been configured out of the bottom layer 1.

Furthermore, a structure is formed of a resonator 4, which is joined by way of the resonating bars 5 to the frame 11. The resonator 4 has a bottom plate 14, which is configured out of the first silicon layer 1. The top silicon layer 3 of the resonator 4 has fixing points (anchors) 23, which are fixed through the insulating sacrificial layer 2 to the bottom plate 14 of the resonator.

Figure 4:
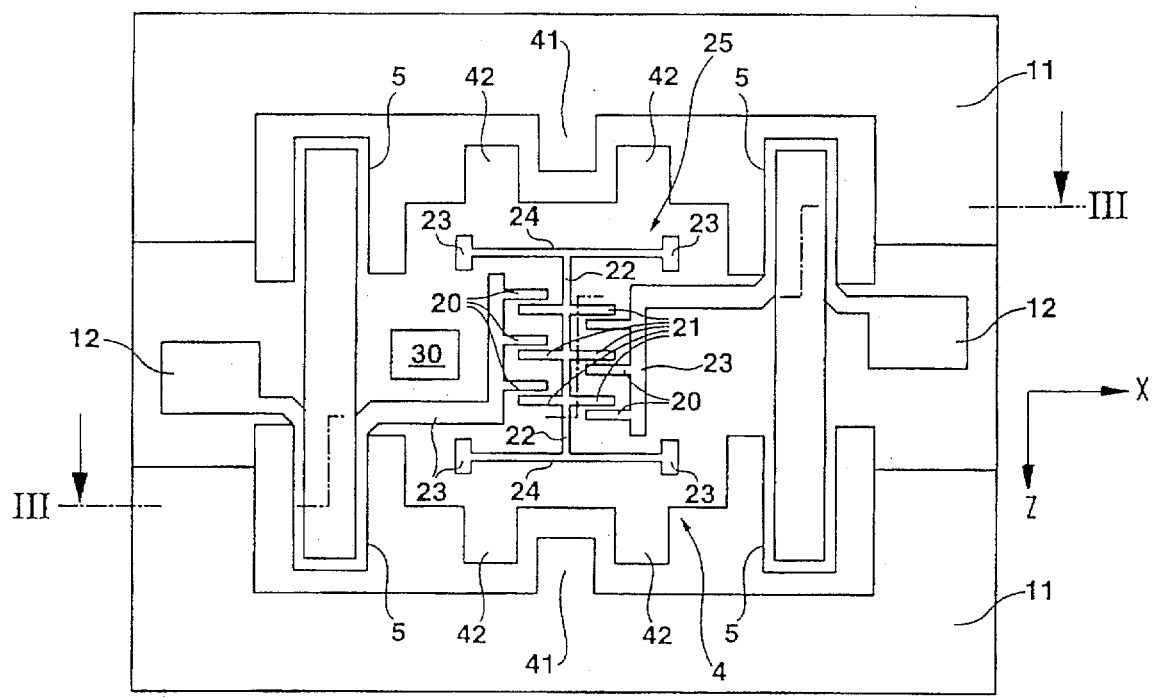
FIG. 4 shows a plan view of the rpm sensor according to FIG. 3.

Furthermore, a movable middle bar 22 or movable electrodes 21 are configured out of the upper silicon layer 3 of the resonator 4, as revealed in the plan view of FIG. 4. The middle bar 22 is suspended on springs 24, which are secured, in turn, to fixing points 23. The springs 24 have a relatively narrow form in the Z-direction, so that the middle bar 22 and the movable electrodes 21 are displaceable in response to an acceleration in the Z-direction. This results in a change in the capacitance between the movable electrodes 21 and the fixed electrodes 20, which are rigidly joined by fixing points 23 to the bottom plate 14 of the resonator 4. The fixing points 23, the springs 24 of the middle bars 22, the movable electrodes 21, and the stationary electrodes 20 form an acceleration sensor 25, which measures accelerations in the Z-directions.

As revealed in FIG. 4, the fixing points 23 are configured out of the top silicon layer 3 of resonator 4 so as to electrically isolate fixing points 23 or groups of fixing points 23 from one another. A group of fixing points 23 is provided for suspending the springs 24. Furthermore, two fixing points 23, which are isolated from one another, are provided for stationary electrodes 20. As shown in FIG. 3, these fixing points 23 are directly connected to the upper silicon layer 3 of resonating bars 5, so that an electrical signal from stationary electrodes 20 can be conducted via resonating bars 5 to frame 11. On the frame 11, contact regions 12, which are joined to the upper silicon layer 3 of resonating bars 5, are configured out of the top silicon layer 3. Thus, an electrical signal, which appears at the stationary electrodes 20, can be tapped off at contact regions 12. Thus, this design makes it possible to measure a change in capacitance at the plate-type capacitors of the acceleration sensor 25.

FIG. 4 merely shows the contacting of stationary electrodes 20. A contacting of fixing points 23 of resonating bars 24 follows, of course, in the same way, through which means an electrical signal is able to be tapped off from the movable electrodes 21. However, for the sake of brevity, this is not shown graphically in FIG. 4.

FIG. 3 illustrates a schematic cross-section of the sensor along the line III—III. Here, however, the individual dimensions are not given in proportion to one another, for example, the width of the fixing-point regions 23 shown in FIG. 3 is greatly diminished.

The sensor according to FIGS. 3 and 4 corresponds essentially to the sensor described in German Patent Application No. 19 504 151.

To operate the rpm sensor shown in FIGS. 3 and 4, the resonator 4 is set into vibration in the X-direction. Driving means for such vibrations are known, for example, from European Patent Application No. EP 539 393. An area 30 of a magnetic material applied to the resonator 4 is illustrated merely as an example in FIG. 4. By means of an external magnetic field, whose intensity varies over time, the resonator 4 can thus be excited to vibrate.

During operation, the resonator 4 is excited to vibrate in the X-direction. If a rotation then follows about the Y-axis, then a Coriolis acceleration is generated in the Z-direction. This Coriolis acceleration is verified by the acceleration sensor 25, and is a measure for the rotation about the Y-axis.

The resonator 4 is suspended very softly (flexibly) in the X-direction, so that it can be deflected very easily in the X-direction by external linear accelerations. Should these accelerations in the X-direction become extreme and the mechanical strength of the resonating bars 5 be exceeded, the sensor could be destroyed. To prevent this, parallel limit stops 41 and 42 are configured out of the frame 11 and out of the resonator 4. The limit stops 41 and 42 are referred to as parallel limit stops, since they restrict the excursion of the resonator 4 parallel to the individual silicon layers. In FIG. 4, the limit stops 42 of the resonator are fashioned by a corresponding form design of the bottom plate 14, i.e., the limit stops 42 are only configured out of the bottom layer 1. The limit stop 41 of the frame 11 is configured both out of the bottom silicon layer 1 and out of the top silicon layer 3. In the present case, the frame 11 has only one limit stop 41, which is arranged between two limit stops 42 of the resonator 4. Alternatively, it is, of course, also possible to provide any desired multiple configurations of limit stops 41, 42.

Figure 5:
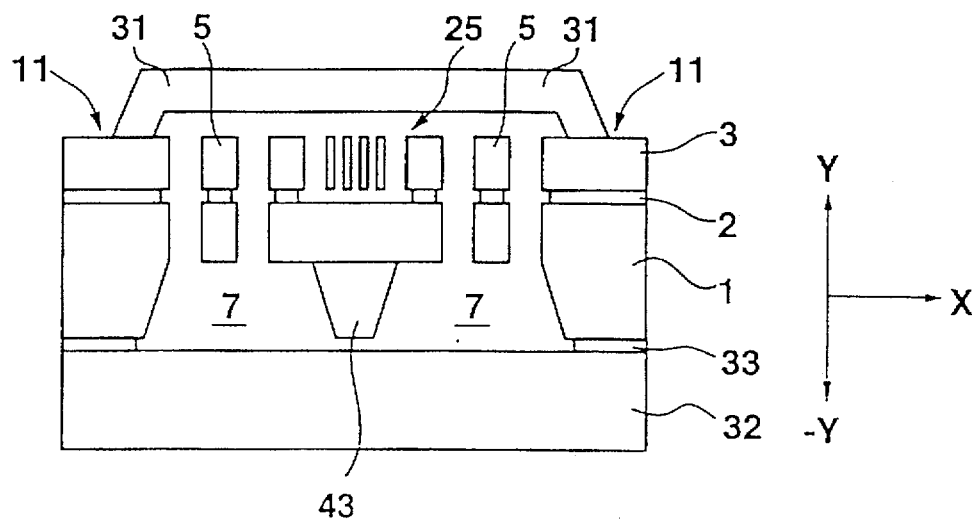
FIG. 5 shows a further exemplary embodiment of the rpm sensor.

Another exemplary embodiment of the rpm (angular velocity) sensor according to the present invention is shown in FIG. 5, which, except for the embodiment of the limit stops, corresponds to the rpm sensor shown in FIG. 3. Objects equivalent to those in FIGS. 3 and 4 are denoted by the same reference symbols. However, in contrast to FIG. 3, a bottom limit stop 43 is provided on resonator 4 to restrict the excursion of resonator 4 in the negative Y-direction. The frame 11 of the rpm sensor is joined via an interconnection layer 33 to a substrate board 32. Again, a substrate board of this type can be made of silicon, glass or other materials. Silicon is preferred, however, because of its low thermal expansion coefficient. Suitable materials for the interconnection layer are silicon oxide, silicon nitride, glass, adhesive or a soldering material. The bottom limit stop 43 is produced in that the recess 7 is essentially provided only underneath the bending bars 5, so that the limit stop 43, in combination with the bottom plate 14 of the resonator 4, has the thickness of the original bottom silicon layer 1. The clearance between the bottom stop means 43 and substrate board 32 can be adjusted by properly selecting the thickness of the interconnection layer 33 or through a defined, local back-etching of the bottom limit stop. The excursion of resonator 4 in the Y-direction is restricted here by a cover 31. This cover 31 can be made of many materials, such as ceramic or metal; however silicon is again preferred, because of the adapted expansion coefficient.

It is also advantageous that the cover 31 and the bottom substrate board 32 form a hermetic cavity in which the rpm sensor is sealed. The sensor element is protected quite efficiently in this manner from disturbing and harmful environmental influences.

Figure 6:
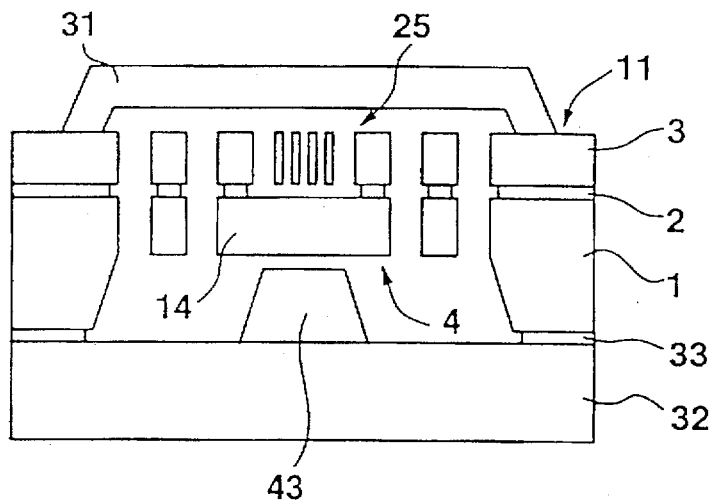
FIG. 6 shows a still further exemplary embodiment of the rpm sensor.

FIG. 6 shows another exemplary embodiment of the rpm sensor according to the present invention, which essentially conforms with FIG. 5. However, in contrast to FIG. 5, the bottom limit stop 43 is configured out of substrate board 32, or applied to substrate board 32. In this embodiment, the clearance between the resonator 4 and the bottom limit stop 43 can be selected independently of the thickness of the interconnection layer 33. It is necessary, however, to observe very precise manufacturing tolerances for the height of the bottom limit stop 43.

Figure 7:
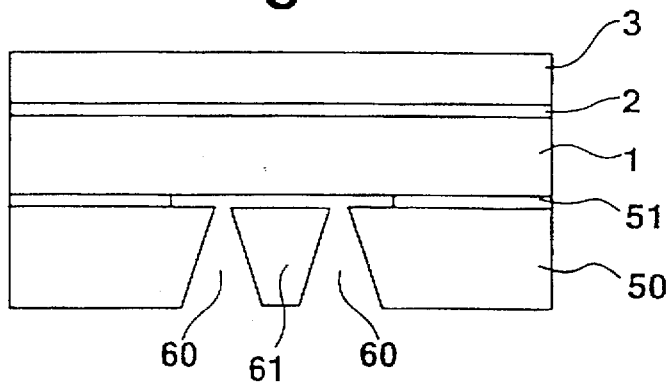
FIG. 7 illustrates a first part of another method for manufacturing an rpm sensor.
Figure 8:
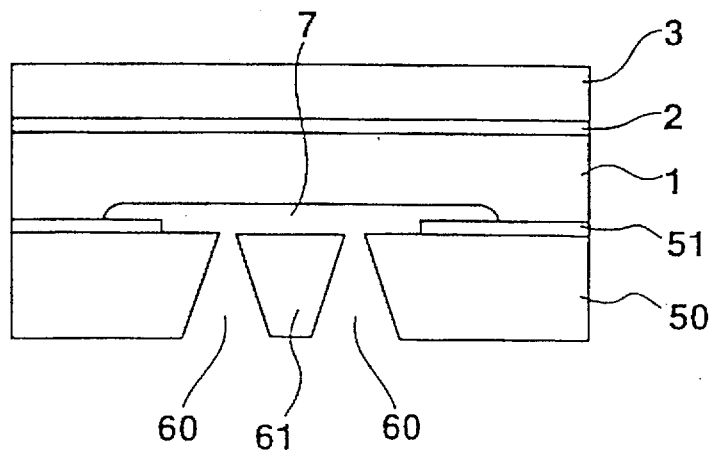
FIG. 8 illustrates a second part of another method for manufacturing an rpm sensor.

FIGS. 7 and 8 show another method for manufacturing rpm sensors with limit stops. This method begins with a silicon wafer 50, upon which is deposited a dielectric insulation layer 51 and, over that, a silicon layer 1. Silicon wafers of this type are available as so-called SOI wafers for manufacturing dielectrically insulated circuits. The silicon layer 1 is then used as a bottom silicon layer for manufacturing an rpm sensor. Through deposition or thermal oxidation, a dielectric insulation layer 2 is then produced on the top side of the silicon layer 1. A polycrystalline silicon layer 3 is then applied by means of deposition. The silicon wafer 50 typically has a thickness of a few 100 μm. The dielectric insulation layer 51 typically has a thickness of between 0.5 to 2 μm; the silicon layer 1 a thickness of between 50 to 100 μm; the dielectric sacrificial layer 2 typically a thickness of between 0.5 and 2 μm; and the top silicon layer 3 typically has a thickness of between 10 and 50 μm.

Starting from the rear side, recesses 60 extending up to the dielectric insulation layer 51 are etched into the silicon wafer 50. Two recesses 60 are shown in FIG. 7, between which a block 61 is arranged. It is clear to one skilled in the art that any desired number of recesses 60 can be used, e.g., even just one large recess 60, so that block 61 may be omitted. An isotropic etching step follows, in which the insulation layer 51 is etched. Because of the isotropy, a controlled, lateral undercut etching also takes place, the extent of which is controlled by the etching rate and the etch time. A fabrication method for an rpm sensor can now be carried out in the top layers 1, 2, 3, as had already been described with respect to FIG. 1. Since the desired dimensions of the thickness of the silicon layer 1 can already be selected beforehand, there is no need to introduce a recess 7 into the rear of the bottom silicon layer 1. In addition, the stability of the rpm sensor is enhanced by the additional silicon wafer 50, so that the frame 11 can also have a thinner design. A bottom limit stop is formed in this case by the silicon wafer 50.

If it is desired to reduce the thickness of the bottom silicon layer 1 still further in the area of the resonator, this can likewise be done, as shown in FIG. 8. However, the bottom silicon layer 1 is etched by means of an isotropic etching process, in which the etching medium is supplied through the recesses 60. In such isotropic etching processes, as well, the residual thickness of the bottom silicon layer 1 is able to be adjusted with a high degree of precision.

Figure 9:
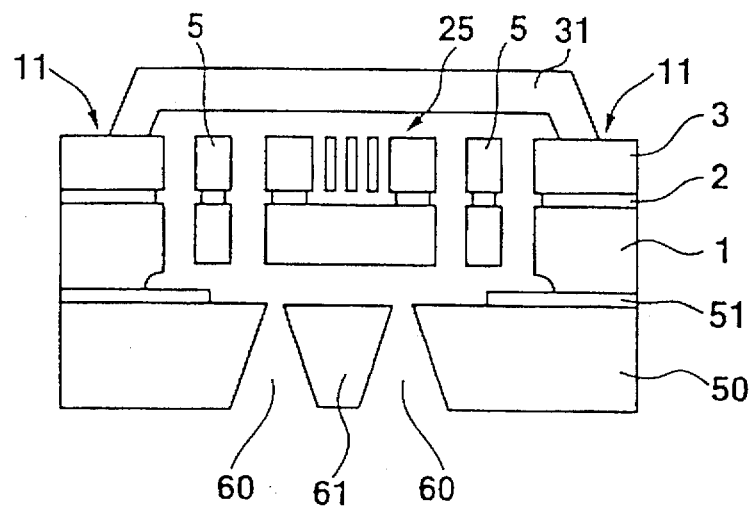
FIG. 9 shows an rpm sensor manufactured in accordance with the method of FIGS. 7 and 8.

FIG. 9 shows a schematic cross-section through an rpm sensor, which was manufactured on the basis of FIG. 8 using the known manufacturing steps from FIGS. 1 through 4. The downward excursion of the resonator 4 is now restricted by the bottom silicon plate 50. The upward excursion of the resonator is limited by the cover 31.

What is claimed is:

1. An angular velocity sensor comprising:
   a multilayer substrate including a top silicon layer, an insulating sacrificial layer arranged below the top silicon layer, and a bottom silicon layer arranged below the insulating sacrificial layer;
   at least one resonating bar;
   a resonator configured out of the multilayer substrate, the resonator being suspended on the resonating bar;
   means for exciting the resonator to vibrate in a first direction;
   an acceleration sensor arranged on the resonator; and
   at least one limit stop configured out of the multilayer substrate, the limit stop limiting movement of the resonator.

2. The angular velocity sensor according to claim 1, wherein the at least one limit stop includes a plurality of limit stops.

3. The angular velocity sensor according to claim 1, wherein the at least one resonating bar includes a plurality of resonating bars.

4. The angular velocity sensor according to claim 2, further comprising a frame surrounding the resonator, and wherein:
   the resonator vibrates in parallel to the multilayer substrate; and
   the limit stops are arranged on the frame and on the resonator so as to limit movement of the resonator in parallel to the multilayer substrate.

5. The angular velocity sensor according to claim 1, wherein:
   a thickness of the bottom silicon layer is decreased underneath the resonator; and
   the limit stop is arranged below the resonator, the limit stop limiting movement of the resonator normal to the first direction.

6. The angular velocity sensor according to claim 5, wherein the limit stop is configured out of the bottom silicon layer.

7. The angular velocity sensor according to claim 1, further comprising:
   a frame surrounding the resonator, the frame having a bottom layer; and
   another plate secured to the bottom layer of the frame.

8. The angular velocity sensor according to claim 7, wherein the another plate is designed as a substrate board having the limit stop.

9. The angular velocity sensor according to claim 7, wherein the another plate is formed by a silicon wafer into which at least one recess is etched.

10. The angular velocity sensor according to claim 1, further comprising:
    a frame surrounding the resonator, the frame having a bottom layer;
    a silicon wafer; and
    an insulation layer joining the bottom layer to the silicon wafer, the insulation layer being removed underneath the resonator and the resonating bar.

11. The angular velocity sensor according to claim 10, wherein the resonator has a bottom plate.

12. The angular velocity sensor according to claim 1, further comprising:
    a frame surrounding the resonator and having a top side; and
    a cover arranged on the top side of the frame.

13. The angular velocity sensor according to claim 1, wherein the first direction is parallel to the multilayer substrate, the acceleration sensor being adapted to measure an acceleration in a second direction which is parallel to the multilayer substrate and perpendicular to the first direction.

* * * * *